United States Patent [19]

Stupp et al.

[11] Patent Number: 5,305,128

[45] Date of Patent: Apr. 19, 1994

[54] ACTIVE MATRIX ELECTRO-OPTIC DISPLAY DEVICE WITH STORAGE CAPACITORS AND PROJECTION COLOR APPARATUS EMPLOYING SAME

[75] Inventors: Edward H. Stupp, Chestnut Ridge; Babar A. Khan, Ossining, both of N.Y.

[73] Assignee: North American Philips Corporation, New York, N.Y.

[21] Appl. No.: 98,662

[22] Filed: Jul. 28, 1993

Related U.S. Application Data

[63] Continuation of Ser. No. 921,953, Jul. 29, 1992, abandoned, which is a continuation of Ser. No. 725,368, Jun. 27, 1991, abandoned, which is a continuation of Ser. No. 456,026, Dec. 22, 1989, abandoned.

[51] Int. Cl.$^5$ ............................................. G02F 1/13
[52] U.S. Cl. ........................................ 359/59; 359/87; 257/347; 257/350
[58] Field of Search .............. 350/333, 334, 336, 345, 350/339 F, 337; 340/784; 357/23.7, 4; 359/54, 59, 87, 88; 257/347, 350, 352

[56] References Cited

U.S. PATENT DOCUMENTS

| | | | |
|---|---|---|---|
| 4,431,271 | 2/1984 | Okubo | 350/334 |
| 4,582,395 | 4/1986 | Morozumi | 350/334 |
| 4,778,560 | 10/1988 | Takeda et al. | 357/23.7 |
| 4,861,142 | 8/1989 | Tanaka et al. | 350/345 |
| 4,864,390 | 9/1989 | McKechnie et al. | 350/345 |
| 4,909,601 | 3/1990 | Yajima et al. | 350/345 |
| 4,955,697 | 9/1990 | Tsukada et al. | 350/334 |
| 5,017,984 | 5/1991 | Tanaka et al. | 357/23.7 |
| 5,042,916 | 8/1991 | Ukai et al. | 357/23.7 |

FOREIGN PATENT DOCUMENTS

| | | | |
|---|---|---|---|
| 58-106860 | 6/1983 | Japan | 357/4 |
| 59-7344 | 1/1984 | Japan | 350/333 |
| 62-10619 | 1/1987 | Japan | 357/333 |
| 63-70832 | 3/1988 | Japan | 359/59 |
| 63-210823 | 9/1988 | Japan | 340/784 |
| 1-144022 | 6/1989 | Japan | 350/336 |

OTHER PUBLICATIONS

Kobayashi et al., "Rear-Projection TV using high resolution a-Si TFT-LCD", 1989, SID Digest, pp. 114-117, paper No. 8.5.
Brody et al., "A 6×6 inch 20 lines-per-inch LC display panel", IEEE transactions on electron devices, vol. ED-20, No. 11, Nov. 1973.
Lakatos, "Promise and Challenge of Thin-Film Silicon approaches to Active Matrices", SID, vol. 24/2, 1983.

*Primary Examiner*—Rolf Hille
*Assistant Examiner*—Minhloan Tran
*Attorney, Agent, or Firm*—John C. Fox

[57] ABSTRACT

The capacitance of a pixel of an active matrix liquid crystal light valve is increased without reducing its optical transparency by adding polysilicon islands under the adjacent gate lines, degeneratively doping the islands to render them conductive under operating conditions, thermally oxidizing the islands to form dielectric layers, depositing gate lines over the dielectric layers to form extra capacitors, and connecting the islands to the adjacent pixel electrodes. Such active matrix displays are advantageously employed in a color projection TV to produce the separate red, blue and green components of a full color display.

8 Claims, 5 Drawing Sheets

ACTIVE MATRIX ELECTRO-OPTIC DISPLAY DEVICE WITH STORAGE CAPACITORS AND PROJECTION COLOR APPARATUS EMPLOYING SAME

Tis is a continuation of U.S. patent application Ser. No. 07/921,953, filed Jul. 29, 1992, now abandoned which was a continuation of U.S. patent application Ser. No. 07/725,368, filed Jun. 27, 1991, now abandoned, which was a continuation of U.S. patent application Ser. No. 07/456,026, filed Dec. 22, 1989, now abandoned.

BACKGROUND OF THE INVENTION

This invention relates to active matrix electro-optic display devices, and more particularly relates to such devices having a capacitive element associated with each pixel of the matrix, and also relates to color projection apparatus incorporating these devices.

In one form of color projection television (PTV) in widespread use today, a full color display is formed by superimposing three different (red, blue and green) monochrome images on a projection screen. While these monochrome images are usually formed using cathode ray tubes (CRTs), it has also been proposed to use active matrix electro-optic displays such as thin film transistor (TFT) switched twisted nematic liquid crystal displays (TN LCD) in place of the CRTs to generate these images.

In a LCD cell operating in the transmission mode (sometimes referred to as a "light valve"), a liquid crystal (LC) material is sandwiched between two optically transparent walls, the inner surfaces of which each carry an orienting layer in contact with the LC, for promoting a preferential alignment of the LC molecules adjacent to the layers. Because the LC molecules also tend to align with one another, as well as with the orienting layers, a twist can be imparted to the LC by assembling the cell with a non-parallel orientation of these layers. For example, arranging the layers with their alignment directions orthogonal to one another produces a 90° twist of a nematic LC from one surface to the other. This twist enables the LC to rotate linearly polarized light by 90°, so that the amount of light transmitted by the device can be controlled by an exit polarizer, called an analyzer. Furthermore, the LC can be untwisted by application of a voltage, so that, for example, light blocked by an analyzer having its polarization direction oriented parallel to that of the entrance polarizer, can be passed by application of an appropriate voltage to the LC cell.

A two-dimensional array of such cells, each cell individually addressable through a matrix of row and column electrodes, can be used to build up a display such as a video image, where each cell constitutes a pixel of information. During the repetitive "scanning" (sequential addressing) of the pixel rows, e.g., in response to a video signal, it has been found advantageous to reduce cross-talk between the pixels by providing a separate switch for each pixel. This so-called "active matrix" addressing scheme depends for its success on the ability of the pixels to hold their charge received during addressing, by virtue of their inherent capacitances, until they are readdressed.

However, charge can leak off the pixels, eg., through the liquid crystal material or through the switch. It is thus common in the design of the pixel to add extra capacitance in order to improve its charge storage capacity. One way of introducing the extra capacitance that has been used is to extend the transparent pixel electrode to overlap the adjacent row electrode above the cross-over dielectric between the row and column electrodes. Since the row electrode remains at a fixed potential except when being addressed, it becomes a convenient base plate for the extra capacitor.

FIG. 1 shows such a prior art arrangement for a pixel of an active matrix TFT switched LCD light valve, in which an array of thin transparent pixel electrodes 10, here of indium tin oxide (ITO), are arranged in a matrix of row and column electrodes, 12 and 14 respectively, separated by a cross-over dielectric 16, here of chemically vapor deposited (CVD) oxide. Each pixel 10 is accessed through a switch such as a TFT 18 (only one of which is shown in the FIG.). The switch includes a polysilicon layer 20, one or more gate electrodes 22 and 24, which overlie channel regions (not shown) in layer 20 and which are connected to the polysilicon row electrode (known as a gate line) 12, a gate dielectric under the gate electrodes (not shown), and source and drain regions 26 and 28, which are respectively connected to the aluminum column electrode (known as a source line) 14 and to the pixel electrode 10.

The extra capacitor 29 is formed by extending the ITO 10 over the adjacent gate line. The cross-over dielectric 16 provides a convenient dielectric for the extra capacitor. However, the CVD layer 16 is usually relatively thick (about 1 micron). Because of this, the amount of extra capacitance that can be obtained in this manner is about the same as the capacitance of the liquid crystal pixel. In projection television, for example, this may not be adequate since the pixels are typically very small (for example 250,000 pixels may be arranged in a 2 square inch area), and hence so is the LC capacitance of each pixel.

Seiko-Epson has approached this problem by forming a thin polysilicon region 30 (see FIG. 2) at the same time that the channel poly silicon 20 is formed for the TFT, and oxidizing it at the same time that the gate dielectric is formed for the TFT 18. Another thick polysilicon line 32 is then formed at the same time that the gate line 12 is formed, extending over the thin polysilicon region 30 to form the extra capacitor 40. The dielectric 34 for the extra capacitor is a relatively thin thermally oxidized layer about 1,000 angstroms thick. The capacitance thus provided is about 5 to 7 times the pixel capacitance. The extra line 32 extends across the entire array in order to allow a bias voltage to be applied to the capacitor so that the undoped thin polysilicon region underlying the extra line is charged to make it conducting under all operating conditions of the TFT. A severe penalty which results from this design is that the extra line reduces the geometric transparency of the pixel by as much as 25% or more.

OBJECTS AND SUMMARY OF THE INVENTION

It is an object of the invention to provide an active matrix electro-optic display device having increased capacitance.

It is another object of the invention to provide such a display device with increased capacitance without substantially reducing the optical transmission of the display.

It is another object of the invention to provide a color projection apparatus incorporating one or more of such active matrix electro-optic devices.

In accordance with the invention, the capacitance of a pixel of an active matrix electro-optic display device is increased in a structure having a conductive island under lying the row electrode adjacent the pixel, the conductive island electrically connected to the pixel, and a thin dielectric layer between the conductive island and the overlying row electrode, to form a capacitor outside the perimeter of the pixel electrode so that the transmission of the pixel electrode is substantially unaffected thereby.

According to a preferred embodiment of the invention, the dielectric comprises an upper surface region of the conductive island, this region converted to a dielectric state by surface treatment, for example thermal oxidation, of the island.

According to a particularly preferred embodiment of the invention, the active matrix electro-optic device is a TFT-switched LCD, in which an array of pixel elements defined by electrodes of a transparent conductive material such as ITO is associated with an array of TFT switches whose sources are connected to column electrodes, whose gates are connected to orthogonally related row electrodes and whose drains are connected to the pixel electrodes.

According to another aspect of the invention, the capacitance of a pixel of an active matrix electro-optic display device is increased by a method comprising the steps of:

a) providing a conductive island under the row electrode adjacent the pixel, b) providing a dielectric layer between the conductive island and the overlying row electrode, and c) electrically connecting the conductive island to the pixel electrode.

According to a preferred embodiment of the method of the invention, the dielectric layer is provided by treating the surface of the conductive island, for example by thermal oxidation of the layer.

According to another preferred embodiment of the method of the invention, the active matrix electro-optic display device is a TFT switched LCD, the conductive island is provided by first depositing polysilicon and then degeneratively doping it either n or p type, and the dielectric layer is provided by thermally oxidizing the surface of the doped polysilicon island to convert it to a silicon oxide layer.

According to another aspect of the invention, a color projection apparatus incorporates one or more of such displays devices with increased capacitance. Preferably the apparatus is a television, and one display device is provided for each of the separate red, blue and green channels of a television signal, whereby a full color display is formed by superimposing the three separate images obtained on a projection screen.

DESCRIPTION OF THE PREFERRED EMBODIMENTS

Figure 1:
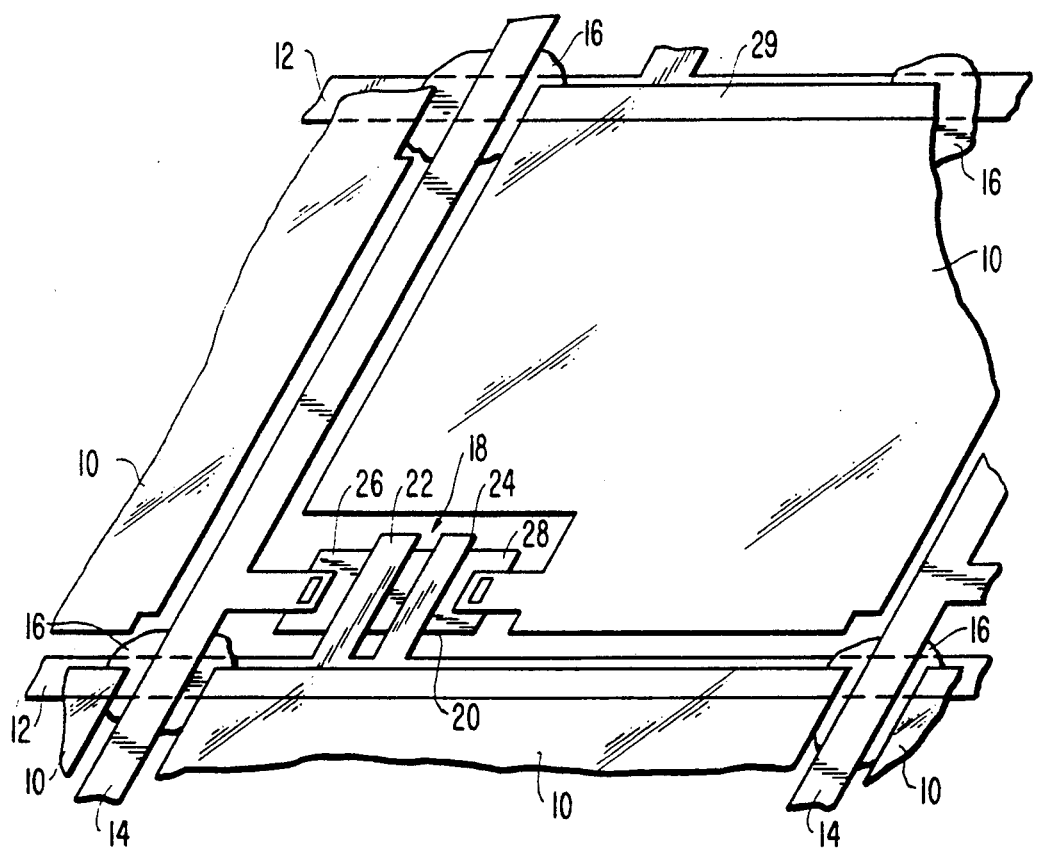
FIG. 1 is a diagrammatic perspective view of one arrangement for providing increased capacitance to a pixel of an active matrix TFT switched LCD of the prior art.
Figure 2:
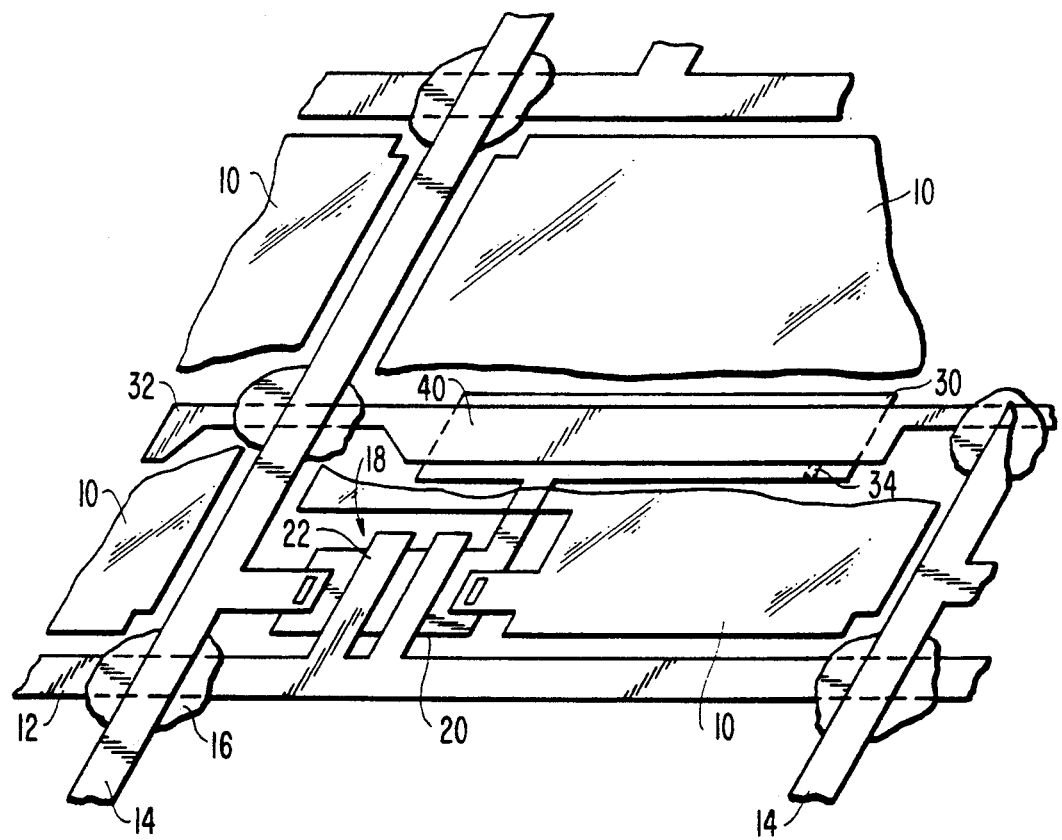
FIG. 2 is a diagrammatic perspective view similar to that of FIG. 1 showing another arrangement for providing increased capacitance to a pixel of an active matrix TFT switched LCD of the prior art.

FIGS. 1 and 2 have already been referred to in the Background of the Invention to explain two different prior art arrangements for increasing the capacitance of a pixel of an active matrix TFT switched LCD.

Figure 3:
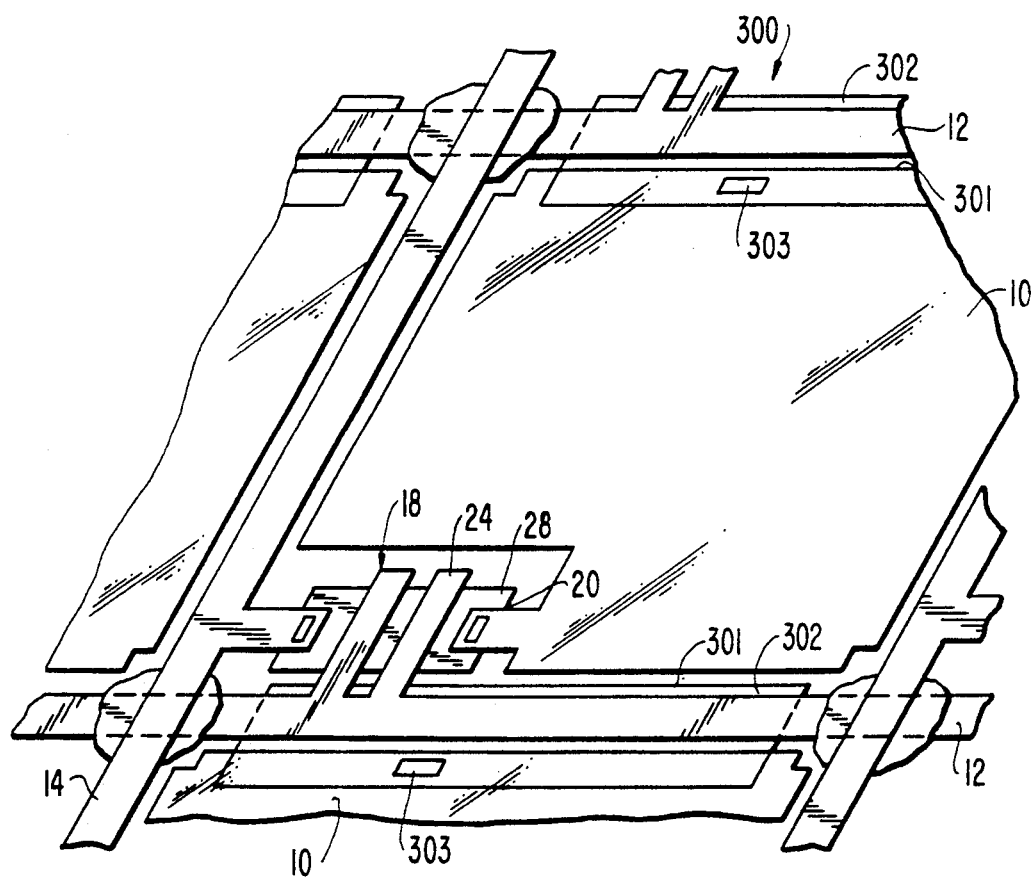
FIG. 3 is a diagrammatic perspective view similar to those of FIGS. 1 and 2 showing one embodiment of an arrangement for providing increased capacitance to a pixel of an active matrix TFT switched LCD according to the invention.

FIG. 3 shows an arrangement for providing added capacitance to such a pixel in accordance with the invention. The nth pixel electrode in a column of an array of such electrodes 10 is addressed through TFT 18 by means of its electrical connection to drain region 28 of polysilicon layer. A capacitor 300 for this pixel is formed by providing a conductive island 301 under the adjacent gate electrode 12, and by providing a thin dielectric layer 302 on the surface of the conducting layer 301 under the gate electrode. Electrical connection of the nth pixel electrode 10 to the capacitor 300 is provided at area 303 by conventional means. Preferably, the conducting island 301 is a thin layer of polysilicon which is deposited on the underlying substrate at the same time that polysilicon channel region 20 is deposited for TFT 18. Since the polarities of the voltages in the pixel during operation would be such as to keep such a thin polysilicon island 301 depleted and hence non-conducting, the island is degeneratively doped either n or p type in order to render it conducting under all operating conditions.

A principle advantage of using such a polysilicon island 301 is that the dielectric for the capacitor may be formed by thermal oxidation of the surface of the island 301 at the same time that the surface of the polysilicon channel region 20 is thermally oxidized to form the gate dielectric for the TFT 18. As is known, the dopant for the island 301 may be diffused or implanted before or after thermal oxidation is carried out.

One way of achieving the desired structure is to deposit a thin polysilicon layer uniformly over the entire substrate, deposit a thick photoresist layer on the thin polysilicon layer, pattern the photoresist layer to cover the regions where the TFTs will be formed, and implant the exposed areas of polysilicon to achieve degenerative doping, wherein the photoresist acts as an implant mask for the TFT regions. The resist is then stripped and the polysilicon layer is etched to define the channel regions 20 for the TFTs and the conducting islands 301 for the capacitors. After this definition, the polysilicon structures remaining are thermally oxidized, during which the implants of the island 301 are activated.

Because the thin polysilicon island 301 for the capacitor 300 is degeneratively doped, it cannot be biased into depletion during operation and thus is able to function as a capacitor electrode. Gate line 12, which may also be of polysilicon, are then formed over the dielectric layer 302 to complete the capacitor 300. In this construction, the capacitors do not occupy any of the normally transparent regions of the pixels defined by the perimeters of the pixel electrodes 10, and thus do not effect transparency of the pixels.

Figure 4:
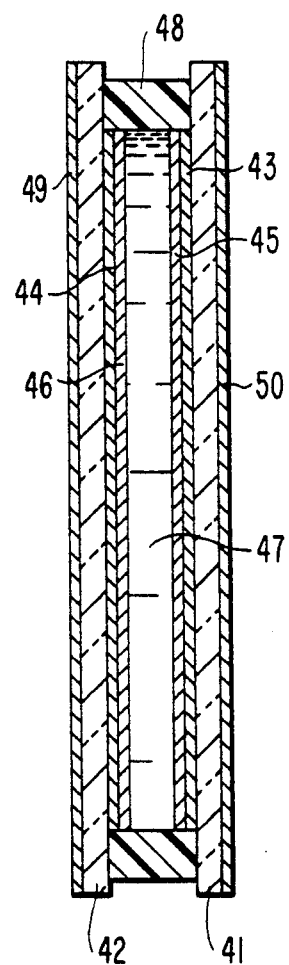
FIG. 4 is a diagrammatic cross-section of an LCD of the type shown in FIGS. 1-3.

A cross-section of the device of the type shown in FIGS. 1-3 is shown in FIG. 4. Of two glass supporting plates 41 and 42, the supporting plate 41 carries on its inner surface a pattern of row and column electrodes, and an array of pixel electrodes and associated TFTs, illustrated schematically as layer 43. Supporting plate 42 carries a transparent counter electrode 44. Orienting layers 45 and 46 are present on the inner surfaces of the layer 43 and the counter electrode 44, these orienting layers formed for example by vapor deposition of silicon oxide (SiO) at an oblique angle to the normal of the surfaces. A nematic liquid crystal material 47, such as the proprietary formulation known as ZLI 84-460, manufactured by E. Merck of Darmstadt, West Germany, containing a chiral addition of for example n cyano 4'-(2-methyl)-isobutyl-biphenyl (obtainable as CB15 from DBH Chemicals, Poole, England), is present between the supporting plates. The spacing between the plates is typically about 6 to 8 microns and is maintained by spacer beads which are distributed regularly over the surfaces of the plates, and are not shown in the drawing. A sealing edge 48 joins the plates together at their circumference. As a result of the obliquely vapor deposited silicon oxide layers, the liquid crystal molecules undergo a rotation of approximately 90° over the cell thickness. The chiral additive determines the direction of twist of the liquid crystal molecules, CB15 imparting a counter clockwise twist.

The outer surfaces of the supporting plates 41 and 42 furthermore each carry a linear polarizer. Polarizer 49 intercepts the incident light indicated by the arrow in the drawing, and analyzer 50 intercepts the light transmitted by the device.

The display cell can be switched from a first stable state to a second stable state differing optically from the first by driving the electrodes in a suitable known manner. With a parallel orientation of polarizer and analyzer, a selected display cell or pixel in the off-state (no voltage applied) will be dark (light absorbing). By rotating one of the polarizers 90° with respect to the other, (crossed orientation) a white (light transmitting) off-state can be achieved.

Figure 5:
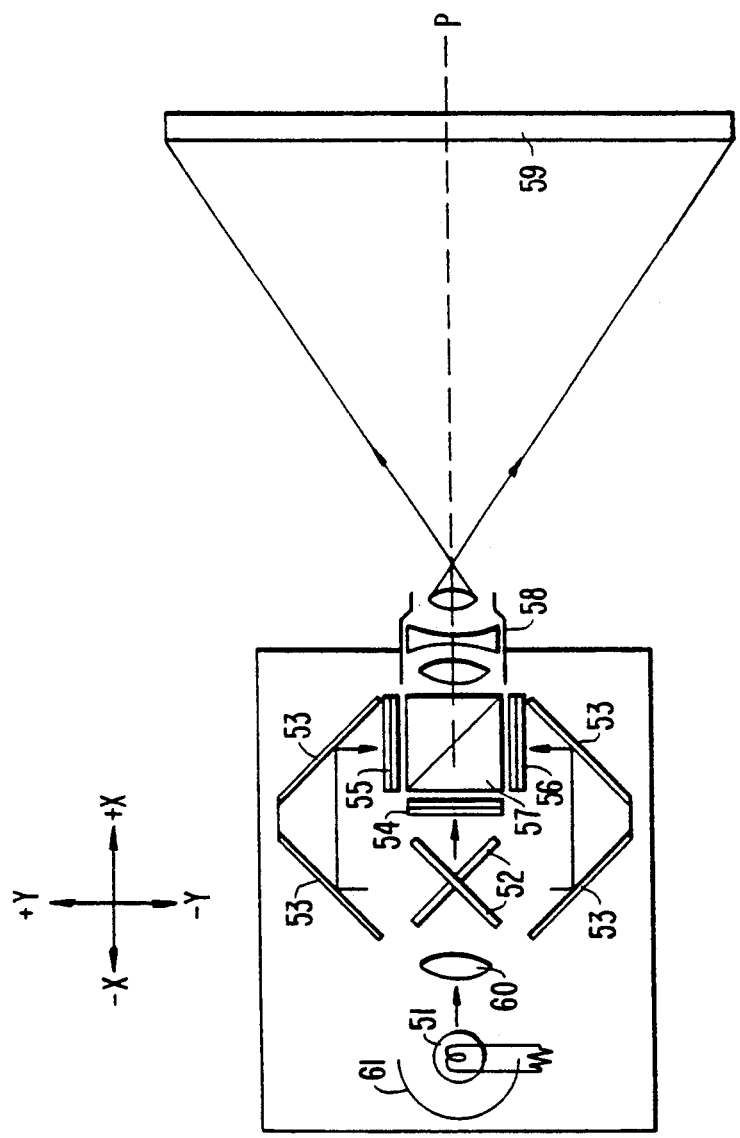
FIG. 5 is a diagrammatic plan view of one embodiment of an LCD color PTV system employing three LCDs of the invention.

Referring now to FIG. 5, there is shown a diagrammatic representation of an LCD color PTV system employing a front projection screen. In the arrangement shown, light from a tungsten halogen lamp 51 is variously transmitted and reflected through a cross pair of dichroic mirrors 52 and adjacent mirrors 53 to pass through three active matrix TFT switched LCDs 54, 55 and 56. These three LCDs, acting as light valves in the transmissive mode, modulate three channels to create the red, green and blue portions of a TV picture. The dichroic mirrors 52 break the white light from source 51 into red, blue and green portions of the spectrum. These three color portions are then recombined by way of a dichroic prism 57. The recombined light is projected by way a projection lens 58 along a projection axis P to a projection screen 59.

This arrangement also includes a condenser arrangement consisting of a condenser lens 60 and a reflector 61. Condenser lens 60 is designed for maximum collection efficiency to collect light emitted in the +X direction. The spherical reflector 61 collects light emitted in the −X direction and images the light of the lamp back onto itself.

The invention has been described in terms of a limited number of embodiments. Other embodiments within the scope of the invention and the appended claims are contemplated. For example, the dielectric layer of the extra capacitor may be silicon nitride formed on the conducting island, for example, by chemical vapor deposition. The pixels of the array need not be switched by a three terminal device such as a thin film transistor, but may also be switched by a two terminal device, for example, a non-linear switch such as a diode or MIM. In addition, the electro-optic medium need not be a nematic liquid crystal, but could be another liquid crystal material such as a super twist liquid crystal, or another electro-optic material such as a ferro-electric or electro-luminescent material. Furthermore, the display device need not be a light valve operating in the transmissive mode, but could also operate in the reflective mode.

We claim:

1. An active matrix electro-optic display device comprising a pair of walls each having an inner and an outer surface, at least one of which is optically transparent, the walls defining a space between them, an array of pixel electrodes, an array of TFT switches associated with the pixel electrodes, and an array of orthogonally related row and column electrodes, the row electrodes interconnecting the TFT gate electrodes, the column electrodes interconnecting the TFT source electrodes, and the pixel electrodes each connected to an associated TFT drain electrode, the arrays arranged on the inner surface of one of the walls, a counter electrode on the inner surface of the other wall, orienting layers overlying the arrays and the counter electrode on the walls, and an electro-optic material filling the space between the walls and contacting the orienting layers, characterized in that the display includes an array of storage capacitors comprised of islands of degeneratively doped electrically conductive material, each in electrical contact with a pixel electrode, and a layer of a dielectric material between the islands of conductive material and the overlying row electrodes, the islands underlying the row electrodes adjacent the pixels.

2. The display device of claim 1 in which the electro-optical material is a liquid crystal material.

3. The display device of claim 1 in which the electrically conductive material is degeneratively doped polysilicon.

4. The display device of claim 1 in which the islands extend under the adjacent pixel electrodes for a distance sufficient to allow electrical contact with the pixel electrode.

5. A color projection apparatus including:
three electro-optic display devices arranged in separate channels, each comprising a pair of walls each having an inner and an outer surface, at least one of which is optically transparent, the walls defining a space between them, an array of pixel electrodes, an array of TFT switches associated with the pixel electrodes, and an array of orthogonally related row and column electrodes, the row electrodes interconnecting the TFT gate electrodes, the column electrodes interconnecting the TFT source electrodes, and the pixel electrodes each connected to an associated TFT drain electrode, the arrays arranged on the inner surface of one of the walls, a counter electrode on the inner surface of the other wall, orienting layers overlaying the arrays and the counter electrode on the walls, and an electro-optic material filling the space between the walls and contacting the orienting layers;

means for creating separate monochrome components of a color image each corresponding to one of the three primary colors red, blue and green, on the display devices;

and means for recombining and projecting the image components onto a screen to form a full color display, characterized in that at least one of the display devices includes an array of storage capacitors comprised of islands of an electrically conductive material, each in electrical contact with a pixel electric degeneratively doped, and a layer of dielectric material between the islands of conductive material and the overlying row electrodes, the islands underlying the row electrodes adjacent the pixels.

6. The apparatus of claim 5, in which the electro-optical material is a liquid crystal material.

7. The apparatus of claim 5, in which the conductive material is degeneratively doped polysilicon.

8. The apparatus of claim 5 in which the islands extend under the adjacent pixel electrodes for a distance sufficient to allow electrical contact with the pixel electrode.

* * * * *